(12) United States Patent
Chen

(10) Patent No.: US 11,279,432 B2
(45) Date of Patent: Mar. 22, 2022

(54) SELF-BALANCING FOOT PLATFORM DEVICES

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 16/920,125

(22) Filed: Jul. 2, 2020

(65) Prior Publication Data

US 2021/0094647 A1 Apr. 1, 2021

Related U.S. Application Data

(63) Continuation of application No. 15/338,387, filed on Oct. 29, 2016, now abandoned.

(51) Int. Cl.
| | |
|---|---|
| *B62K 11/00* | (2006.01) |
| *A63C 17/12* | (2006.01) |
| *B62K 25/00* | (2006.01) |
| *B62M 7/12* | (2006.01) |

(52) U.S. Cl.
CPC ............ *B62K 11/007* (2016.11); *A63C 17/12* (2013.01); *B62K 25/00* (2013.01); *B62M 7/12* (2013.01); *A63C 2203/40* (2013.01)

(58) Field of Classification Search
CPC ........ B62K 11/007; B62K 25/00; B62M 7/12; A63C 17/12; A63C 17/04; A63C 2203/40
See application file for complete search history.

(56) References Cited

U.S. PATENT DOCUMENTS

| | | | |
|---|---|---|---|
| 8,738,278 B2* | 5/2014 | Chen | B62K 11/007 701/124 |
| 9,376,155 B2* | 6/2016 | Ying | B62K 11/007 |
| 9,499,228 B2* | 11/2016 | Chang | B62K 5/01 |
| 9,682,309 B2* | 6/2017 | Huang | A63C 17/04 |
| 2007/0001414 A1* | 1/2007 | Kang | A63C 17/016 280/87.041 |

* cited by examiner

*Primary Examiner* — John D Walters

(57) ABSTRACT

A fore-aft self-balancing transportation device, typically in a pair, one for the right foot and the other for the left foot of a rider. The platform is limited in size and positioned with a top surface wholly above the drive wheel, such that the platform straddles the axis of rotation of the drive wheel. The wheel may extend laterally to enhance side-to-side stability. The devices are configured for hands-free control, a device being driven forward or backward in response to the fore-aft tilt angle of a rider's foot on the platform (and hence, the fore-aft tilt angle of that platform). Various embodiments and features are disclosed.

20 Claims, 5 Drawing Sheets

SELF-BALANCING FOOT PLATFORM DEVICES

CROSS REFERENCE TO RELATED APPLICATIONS

This application is a continuation of U.S. patent application Ser. No. 15/338,387, filed Oct. 29, 2016, entitled Self-Balancing Vehicle with Adjustable or Movable Positioning of Foot Platforms, and having the same inventor as above. Application Ser. No. 15/338,387 claims the benefit of U.S. Provisional Application No. 62/247,757, filed Oct. 29, 2015, entitled Self-Balancing Vehicle with Separatable Balancing Modules and having the same inventor as above, and U.S. Provisional Application No. 62/292,825, filed Feb. 8, 2016, entitled Self-Balancing Vehicle with Changeable Relative Position of Foot Placement Sections and also having the same inventor as above.

FIELD OF THE INVENTION

The present invention relates to fore-aft self-balancing transportation devices that include two independently movable platform sections, one each for the right and left foot of a rider.

BACKGROUND OF THE INVENTION

The prior art includes U.S. Pat. No. 8,738,278 issued to Shane Chen (the inventor herein) for a Two-Wheel, Self-Balancing Vehicle with Independently Movable Foot Placement Sections. This patent is hereby incorporated by reference as though disclosed in its entirety herein. The '278 patent teaches fore-aft self-balancing of two independently movable (i.e., fore-aft rotatable) foot platforms, as well as drive motors, control circuitry, and other components for operation of such a device.

In the '278 patent, the two wheels are maintained in a fixed position relative to one another. They do not move laterally (to the side) relative to one another and they do not move longitudinally (in the direction of travel) relative to one another.

To accommodate different riding preferences (a wider or narrower stance, for example) and to increase the variety of riding experiences, there is a need for the lateral distance between the foot platforms to be adjustable and/or variable.

Furthermore, if there is a "bump" in a pathway, it is generally easier to ride over it if one wheel encounters it first, rather than both at the same time. In the device of the '278 patent, bumps or dips, such as pronounced sidewalk seams or items laid across a sidewalk (i.e., garden hose, steel construction plates, etc.), are contacted by both wheels at the same time. This tends to cause a rider to be thrown forward off the platforms. If by contrast, one wheel could be extended forward, crossing is easier because a rider can shift his/her weight to the stable foot (the one not immediately encountering the obstacle), allowing the less weighted foot/leg to absorb or avoid the shock of the collision. Once over the obstacle, the rider can transfer weight to that forward foot allowing the rear foot to be less weighted when it contacts the obstacle. Thus, there is a need, in a two foot platform self-balancing device where there is at least one wheel associated with each foot platform, to be able to move one foot platform forward or rearward (in the line of direction of travel) relative to the other.

SUMMARY OF THE INVENTION

Accordingly, it is an object of the present invention to provide personal transportation devices that overcome issues associated with the prior art.

It is another object of the present invention to provide personal transportation devices that each receive a single human foot and are configured for handless operation.

It is also an object of the present invention to improve or enhance the riding experience associated with personal transportation devices by providing two foot platform units that are independently movable by a rider's two feet.

These and related objects of the present invention are achieved by use of the personal transportation devices as described and claimed herein.

The attainment of the foregoing and related advantages and features of the invention should be more readily apparent to those skilled in the art, after review of the following more detailed description of the invention taken together with the drawings.

DETAILED DESCRIPTION

Referring to FIGS. 1-4, a first embodiment of a transportation device 10 with adjustable position foot platform units in accordance with the present invention is shown.

Device 10 may include two foot platforms units 20,40 that receive the left and right foot of a user, respectively. The foot platform units ("FPUs") may be constructed in similar fashion and include the same or similar components. They are each independently fore-aft self-balancing (like the two platform sections of the '278 patent) and include suitable components to achieve this function. These components may include a position (i.e., gyroscopic) sensor, battery, drive motor and control circuitry. The control circuitry instructs the motor to drive the wheel towards FPU balancing based on position data from the sensor. Suitable self-balancing components and arrangements are known in the art.

Figure 1:
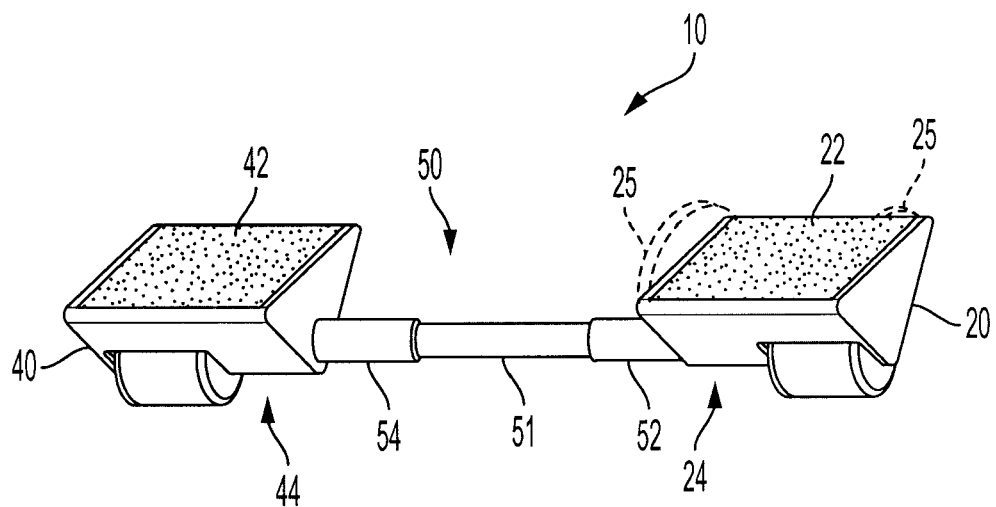
FIGS. 1-2 are perspective views of a first embodiment of a self-balancing transportation device with movable foot platform units, the platform units in the extended position.
Figure 2:
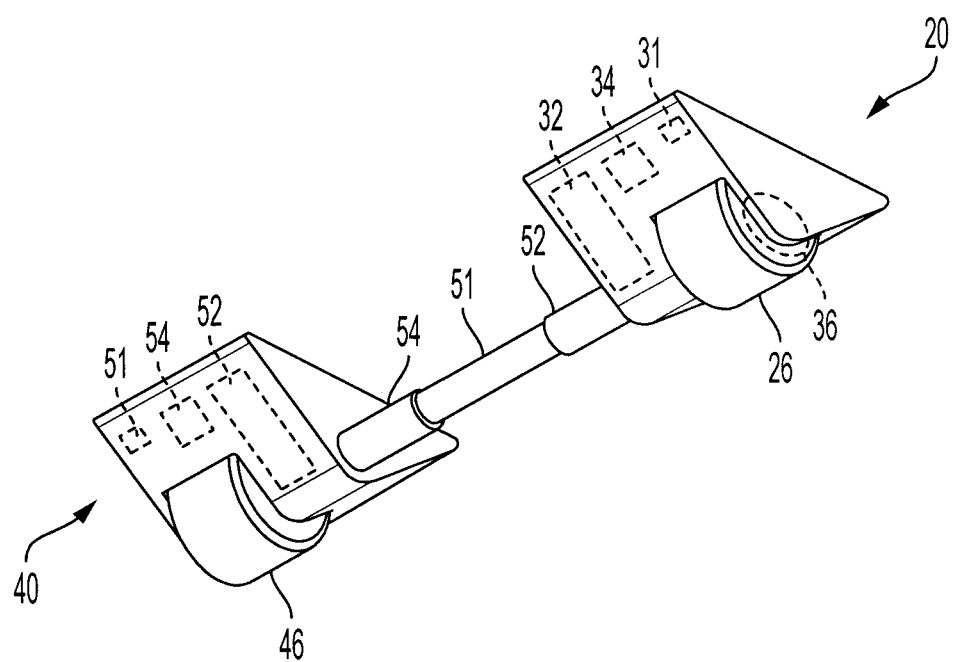

In FIG. 2, the sensor 31,51, battery 32,52 and control circuitry 34,54 are shown in phantom lines because they are within housing 24,44, respectively. The drive motor 36,56 is preferably a hub motor within wheel 26,46, respectively.

Each FPU may include a foot platform 22,42 and housing 24,44. Platform side walls 25 (shown in FIG. 1 in phantom lines) may extend upwardly from the outside and/or inside edges of the platforms. These sidewalls help to position a user's foot and to permit a user to exert a lateral force to slide the FPUs towards or away from one another. While sidewalls are only shown on FPU 20, the sidewalls may also be provided with FPU 40. Housing 24,44 supports the platforms 22,42, houses the self-balancing components, and may provide internal structural support.

Figure 3:
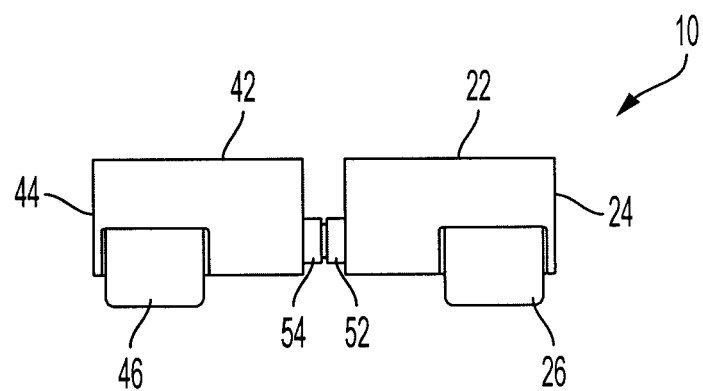
FIGS. 3-4 are views of the transportation device of FIGS. 1-2 yet with the foot platform units in a contracted or stowage position.
Figure 4:
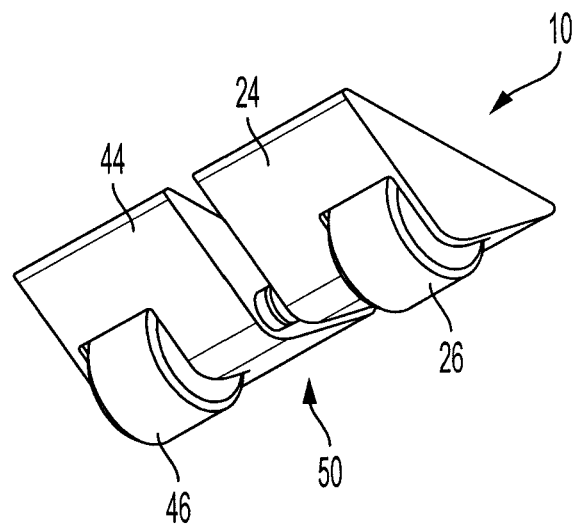

A connector or connecting structure 50 is preferably provided between the two foot platform units. Connector 50 may have a shaft or rod like configuration and is preferably telescoping or the like such that FPUs 20,40 can be moved from an extended position (shown in FIGS. 1-2) to a contracted position (shown in FIGS. 3-4), and vice versa. Connector 50 may include a main rod 51 and two retractable sheaths 52,54. In FIGS. 3-4, rod 51 has penetrated into a complementary space within the two housings, as have the retractable sheaths.

The connector 50 may be configured such that the FPUs may be positioned at a desired lateral distance from one another and the connector releasably secured with the FPUs at that distance. A rotating latch or biased pins or expanding rotary wedge or other suitable mechanism (known in the art) may be used to releasable set a desired spacing. The connector may also be configured such that the FPUs are not set at a fixed distance and a rider can expand and reduce the FPU spacing during use by exerting an outward or inward force through his or her feet.

In the embodiment of FIGS. 1-4, the axis of rotation of wheels 26,46 is preferably co-linear. Furthermore, in a preferred embodiment, the axis of connector 50 is preferably co-linear with the axis of the wheels 26,46.

Further, since each FPU is independently tiltable (in fore-aft), turning is achieved by the rider leaning forward or backward on one FPU more than the other, in the same way that devices of the '287 patent turn.

Figure 9:
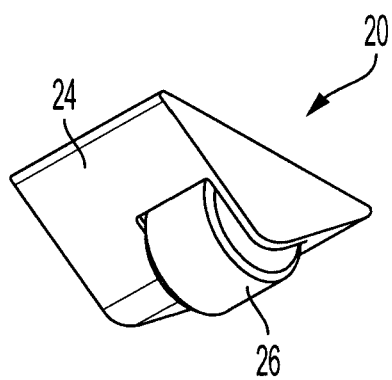
FIG. 9 is a front elevation view of a foot platform unit shown in FIGS. 1-4.

It should also recognized that connector 50 may be configured such that rod 51 is releasably decouplable from the FPUs to minimize size for stowage or to allow the FPUs to be operated individually without a connector. FIG. 9 illustrates FPU 20 decoupled from connector 50, thus allowing this individual (i.e., decoupled) operation.

Figure 5:
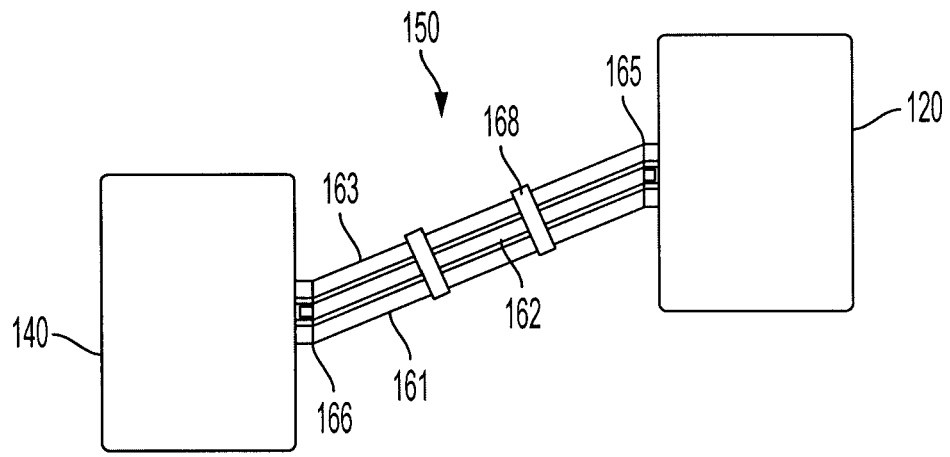
FIGS. 5-7 illustrate another embodiment of a self-balancing transportation device with movable foot platform units.
Figure 6:
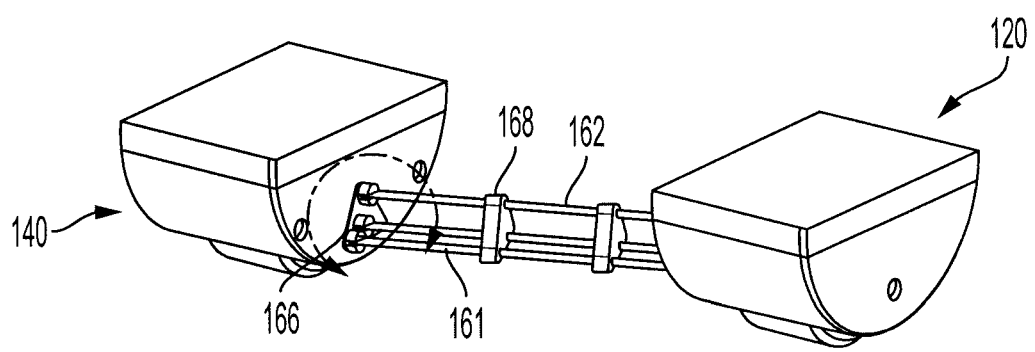
Figure 7:
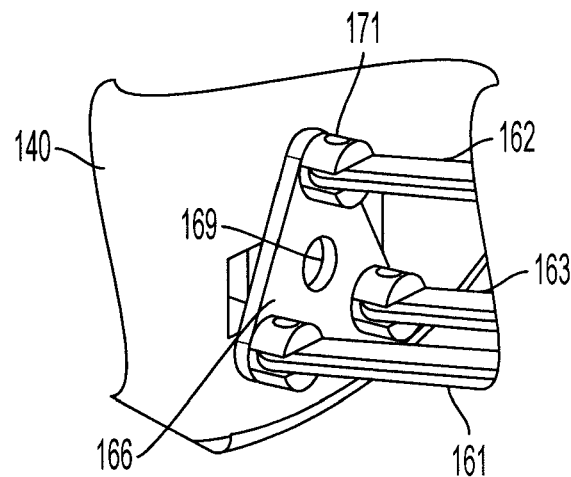
Figure 10:
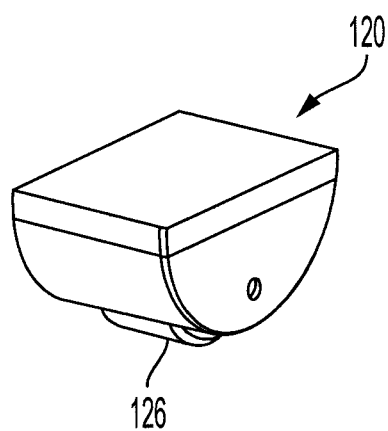
FIG. 10 is a perspective view of a foot platform unit shown in FIGS. 5-7.

Referring to FIGS. 5-7, another embodiment of a transportation device 110 in accordance with the present invention is shown. Device 110 includes two self-balancing FPUs 120,140 that may be the same or similar to FPUs 20,40 of device 10. FPUs 120,140 preferably include similar components such as a battery, position sensor, control circuitry and drive motor (hub based or otherwise). Similar to FPU 20 of FIG. 9, FIG. 10 illustrates FPU 120 decoupled from the connecting structure 150.

In device 110, the connecting structure 150 is preferably configured such that it maintains a parallel relationship between the FPUs, while permitting one FPU to be moved forward or backward longitudinally relative to the other FPU. In the embodiment of FIGS. 5-7, the connection structure 150 also permits the FPUs to be independently fore-aft rotated to achieve turning of the device.

For example, in FIGS. 5-7, device 110 has three rods (or elongated members) 161-163 that extend between the FPUs and are pivotally coupled (through pivots 171) to plates 165,166 which are secured to FPUs 120,140, respectively. Support or frame members 168 preferably hold rods 161-163 at a fixed spacing from one another. Rods 161-163 are preferably sufficiently strong to maintain the parallel relationship of the FPUs, yet sufficiently flexible that the FPUs may rotate in fore-aft relative to each other. Steel or strong plastic or other materials may be suitable for this. In such a configuration, the plates 165,166 are non-rotatably coupled to their respective FPUs and rotation comes from the flexibility of the connector rod material.

It should be noted that the number of connector rods 161-163 could vary as long as the strength and flexibility characteristics are maintained to allow a substantially parallel FPU relationship and independent fore-aft rotation. Furthermore, it should be noted that in place of the mildly flexible, parallel-position maintaining structure of FIGS. 5-7, connector 150 could be implemented with a torsion bar or the like that possesses both sufficient rigidity and flexibility (particularly directional flexibility). A suitable torsional bar is described in U.S. Pat. No. 8,157,274 entitled Torsional Flexible Connecting Structure for Transporting Device, by Chen.

Referring to FIG. 7, in the embodiment of device 110 described above, plate 166 is non-rotatably mounted to FPU 140. In an alternative embodiment, the connecting, parallel-position maintaining rods 161-163 could be made of a more rigid/less flexible material and plates 165,166 could be rotatably mounted to the FPUs. For example, the plates could be mounted about a central pivot 169. This would allow the FPUs to rotate fore-aft relative to one another, and move forward and backward longitudinally, while maintaining the parallel relationship of the FPUs. Pivot 169 is preferably both equidistant from rods 161-163 and co-linear with the axis of the wheels 126,146.

Figure 8:
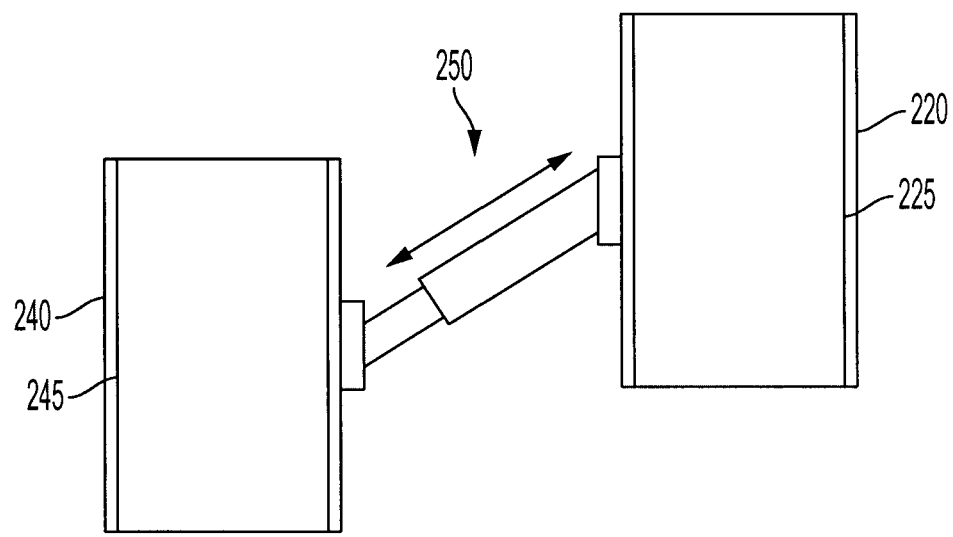
FIG. 8 is a plan view of yet another embodiment of a self-balancing transportation device with movable foot platform units.

Referring to FIG. 8, top plan view of yet another embodiment of a transportation device 210 in accordance with the present invention is shown. Device 210 is similar to that of devices 10,110 discussed above and includes FPUs 220,240 that function in the same or similar manner. The FPUs preferably have sidewalls 225,245 discussed above with reference to FIG. 1. FIG. 8 discloses a connector structure 250 that preferably maintains the FPUs in a parallel arrangement and permits fore-aft rotation and longitudinal movement of the FPUs relative to one another (as was the case with device 110). Device 210 also provides telescoping of connector 250 so that the distance between the FPUs can be altered, either on the fly or set to a desired spacing.

In one embodiment of device 210, the distance between the FPUs is biased by a spring internal to connector 250 to a minimum distance. However, if the rider sees a bump coming in the path, the rider may exert an outward (lateral) pressure on the FPUs to increase the distance between them (applying force opposite the contracting spring) and then place one FPU in front of the other so that the wheels 226,246 of the FPUs contact the obstacle in series rather that in parallel, which is a more stable manner in which to ride over an obstacle. Sidewalls 225,245 assist with foot-supplied application of lateral force.

In another embodiment of device 220, the connector 250 may have no bias spring and be configured to allow rider controlled sliding of the telescoping connector 250 while riding (to enhance the riding experience). In yet another embodiment, the telescoping connector 250 may be configured such that the spacing between the FPUs may be user selected and releasably secured at a desired spacing.

Connector 250 may include the housing shown in FIG. 8 which houses multiple (at least a pair of) connecting shafts that are each telescoping and to the same amount (to maintain parallel FPU alignment). The FPUs may be pivotally connected (through a pivot similar to 169 or the like) to connector 250 to achieve independent fore-aft rotation of the FPUs.

FIGS. 1,3,6 and 8-10 illustrate that the drive wheel is located wholly vertically below the foot platform of its respective FPU. FIGS. 6 and 10 illustrate that wheels 126,146 are substantially flat along their bottom to provide lateral stability (to maintain the device upright laterally), and they are substantially centered laterally relative to their respective foot platforms 120,140. FIGS. 6 and 10 also shown that the width of wheel 126 is at least half the width of its foot platform 120. It can also be seen, when viewed laterally, for example, as in FIG. 3, that the bottom of wheel 26 is more flat than curved.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims. Furthermore, the term wheel member as used in the claims refers to any wheel type device that has an axis of rotation and an outer circumferentially-disposed surface that contacts the ground during use for locomotion. This may include a wheel as shown in FIGS. 6 and 10 (and others) or two wheels connected by a common axle that move in common, thus acting as a single wide wheel, or related structures.

The invention claimed is:

1. A personal transportation device, comprising:
a foot platform configured to support a foot of a rider in use;
a wheel member located wholly vertically below the foot platform;
a motor that drives the wheel member;
a position sensor; and
a control circuit that drives the motor based on data from the position sensor;
wherein the wheel member is substantially centered, laterally, relative to the foot platform; and
wherein the device is configured for handless control.

2. The device of claim 1, wherein the wheel member, in lateral cross-section, has a laterally extending circumferentially disposed ground contact surface that has a portion that is substantially flat.

3. The device of claim 1, wherein the bottom of the wheel member when viewed in lateral cross-section has a substantially flat portion that extends a greater distance laterally than a curved portion of the wheel member extends laterally.

4. The device of claim 1, wherein the wheel member has an axis of rotation disposed substantially laterally and, when the device is upright and the platform substantially horizontal, a plane extending vertically upward from the axis of rotation intersects the platform; and
wherein the platform is configured to receive one of the heel and ball of a rider's foot on one side of the vertical plane and to receive the other of the heel and ball of that rider's foot on the other side of the vertical plane such that the rider's foot straddles the axis of rotation and can thus control fore-aft tilt of the platform.

5. The device of claim 1, wherein the foot platform has an average lateral width, and the wheel member has a lateral width that is less than the average lateral width of the foot platform.

6. The device of claim 1, wherein the platform has an average lateral width, and the wheel member has a lateral width that is half or more of the average lateral width of the foot platform.

7. The device of claim 1, wherein the foot platform rotates in fore-aft about a control axis and the control axis is coaxial with the axis of rotation of the wheel member;
the motor is a hub motor; and
the position sensor senses fore-aft tilt angle.

8. The device of claim 1, wherein the device is configured to be free-standing laterally such that the support provided by the wheel member in contact with the ground, when the device is positioned upright on a horizontal surface, is sufficient to maintain the device upright laterally, without additional structural support that contacts the ground elsewhere.

9. The device of claim 1, wherein the foot platform is longer than wide.

10. An auto-balancing transportation device, comprising:
a foot platform tiltable in fore-aft about a control axis;
a wheel member located wholly vertically below the foot platform, the wheel member having an axis of rotation disposed substantially laterally and, when the device is upright and the platform substantially horizontal, a vertical plane extending upward from the axis of rotation intersects the platform;
a motor that drives the wheel member;
a position sensor; and
a control circuit that drives the motor based on data from the position sensor;
wherein the foot platform is configured to receive one of the heel and ball of a rider's foot on one side of the vertical plane and to receive the other of the heel and ball of that rider's foot on the other side of the vertical plane such that the rider's foot, when on the foot platform, straddles the axis of rotation of the wheel member and can control the fore-aft tilt of the foot platform; and
wherein the device is configured to be free-standing laterally such that the support provided by the wheel member in contact with the ground, when the device is positioned upright on a horizontal surface, is sufficient to maintain the device upright laterally, without additional structural support that contacts the ground elsewhere.

11. The device of claim 10, wherein the wheel member is substantially centered, laterally, relative to the foot platform.

12. The device of claim 10, wherein the foot platform has an average lateral width, and the wheel member has a lateral width that is half or more of the width of the foot platform.

13. The device of claim 10, wherein the wheel member, in lateral cross-section, has a laterally extending circumferentially disposed ground contact surface that has a portion that is substantially flat, and this flat portion is substantially centered laterally relative to the wheel member.

14. The device of claim 10, wherein the foot platform rotates in fore-aft about a control axis and the control axis is coaxial with the axis of rotation of the wheel member;
wherein the position sensor senses fore-aft tilt angle;
wherein the motor is a hub motor; and
wherein the foot platform is longer than wide.

15. A auto-balancing transportation device, comprising:
a foot platform configured to support a foot of a rider in use;
a wheel member located wholly vertically below the foot platform;
a motor that drives the wheel member;
a position sensor; and
a control circuit that drives the motor towards auto-balancing the device based on data from the position sensor;
wherein the foot platform has an average lateral width, and the wheel member has a width that is half or more of the average lateral width of the foot platform.

16. The device of claim 15, wherein the bottom of the wheel member, when viewed in lateral cross-section, has a substantially flat portion that extends a greater distance laterally than a curved portion of the wheel member extends laterally.

17. The device of claim 16, wherein the device is configured to be free-standing laterally such that the support provided by the wheel member in contact with the ground, when the device is positioned upright on a horizontal surface, is sufficient to maintain the device upright laterally, without additional structural support that contacts the ground elsewhere.

18. The device of claim 15, wherein the wheel member, in lateral cross-section, has a laterally extending circumferentially disposed ground contact surface that has a portion that is substantially flat, and this flat portion is substantially centered laterally relative to the wheel member.

19. The device of claim 15, wherein the wheel member is substantially laterally centered relative to the foot platform, and the foot platform is longer than wide.

20. The device of claim 15, wherein the wheel member has an axis of rotation disposed substantially laterally and, when the device is upright and the platform substantially horizontal, a vertical plane extending upward from the axis of rotation intersects the platform; and
    wherein the platform is configured to receive one of the heel and ball of a rider's foot on one side of the vertical plane and to receive the other of the heel and ball of that rider's foot on the other side of the vertical plane such that the rider's foot straddles the axis of rotation and can thus control fore-aft tilt of the platform.

* * * * *